(12) United States Patent
Breeze

(10) Patent No.: US 7,111,631 B1
(45) Date of Patent: Sep. 26, 2006

(54) PORTABLE FLUSHING APPARATUS FOR MOTOR VEHICLES

(76) Inventor: Richard C Breeze, 1610 County Rd. 133B, David Creek, CA (US) 96108

( * ) Notice: Subject to any disclaimer, the term of this patent is extended or adjusted under 35 U.S.C. 154(b) by 316 days.

(21) Appl. No.: 10/634,097

(22) Filed: Aug. 4, 2003

(51) Int. Cl.
*B08B 3/02* (2006.01)

(52) U.S. Cl. .................. 134/123; 134/172; 134/198

(58) Field of Classification Search ........... 134/123, 134/104.2, 111, 172, 198
See application file for complete search history.

(56) References Cited

U.S. PATENT DOCUMENTS

| | | | |
|---|---|---|---|
| 2,749,180 A | | 6/1956 | Andrews |
| 3,072,131 A | * | 1/1963 | Di Laurenzio ............ 134/123 |
| 3,321,793 A | * | 5/1967 | Braunger .................. 15/302 |
| 3,342,191 A | * | 9/1967 | Haines ..................... 134/45 |
| 3,670,743 A | * | 6/1972 | Moore ...................... 134/45 |
| 3,698,029 A | * | 10/1972 | Pulliam .................... 15/88.3 |
| 3,729,763 A | * | 5/1973 | Coley ....................... 15/53.4 |
| 3,786,823 A | * | 1/1974 | Wiley ....................... 134/45 |
| 3,795,254 A | * | 3/1974 | Blosser .................... 134/123 |
| 3,923,658 A | | 12/1975 | Lancaster |
| 4,168,231 A | | 9/1979 | Allen et al. |
| 4,867,798 A | * | 9/1989 | Weikmann ................ 134/6 |
| 4,889,147 A | * | 12/1989 | Chandler ................. 134/123 |
| 4,972,862 A | * | 11/1990 | Belanger et al. .......... 134/123 |
| 5,029,758 A | | 7/1991 | Chayer |
| 5,288,334 A | * | 2/1994 | Avril ........................ 134/34 |
| 5,556,535 A | | 9/1996 | Van Der Est |
| 5,597,001 A | * | 1/1997 | Rasmussen et al. ...... 134/104.2 |
| 5,707,014 A | * | 1/1998 | Chan et al. ............... 239/754 |
| 5,820,037 A | * | 10/1998 | Lawrence ................. 239/722 |
| 5,908,550 A | | 6/1999 | Kaipainen |
| 6,045,064 A | * | 4/2000 | Abraham .................. 239/722 |
| 6,055,994 A | * | 5/2000 | Decker ..................... 134/45 |
| 6,079,640 A | * | 6/2000 | Merritts ................... 239/532 |
| 6,247,658 B1 | * | 6/2001 | Bakas ....................... 239/722 |
| 6,648,008 B1 | * | 11/2003 | Price ........................ 137/312 |

FOREIGN PATENT DOCUMENTS

| | | | |
|---|---|---|---|
| DE | 26 42 959 | * | 3/1978 |
| DE | 26 42 959 | * | 7/1978 |
| DE | 28 51 397 | * | 5/1980 |
| DE | 2 499 487 | * | 8/1982 |
| DE | 38 02 409 | * | 8/1989 |
| FR | 2 499 487 | * | 2/1981 |
| FR | 2 608 114 | * | 6/1988 |
| FR | 2 687 627 | * | 8/1993 |

(Continued)

*Primary Examiner*—Frankie L. Stinson
(74) *Attorney, Agent, or Firm*—Michael I. Kroll

(57) ABSTRACT

The present invention 10 discloses a portable spraying apparatus for motor vehicles comprised of a source of water 16, a pump 18 for pressurizing the water, and conduit 20 having a plurality of water outlet apertures 50 therein positioned substantially horizontal to the undercarriage. The portable spraying apparatus for motor vehicles 12 has spaced apart conduit 20 positioned under the vehicle to produce a vigorous spray 42 at the undercarriage 44. The conduit 20 is positioned parallel to the vehicle 12 having conduit positioned adjacent the vehicle with risers 30 for cleaning the exterior sides 46 and wheel wells 48 and under the vehicle with multiple apertures 50 positioned to deliver a spray 42 from 90 to 30 degrees relative to the horizontal. Positioned within the conduit 20 and forming an integral part therewith is at least one connective member 38 having threaded distal ends whereby rotation of one member relative to another can occur to compensate for uneven ground.

16 Claims, 10 Drawing Sheets

FOREIGN PATENT DOCUMENTS

| | | | |
|---|---|---|---|
| GB | 2 377 879 | * | 1/2003 |
| GB | 2377879 | | 1/2003 |
| JP | 62-6854 | * | 1/1987 |
| JP | 2-246853 | * | 10/1990 |
| JP | 6-329002 | * | 11/1994 |
| JP | 7-246917 | * | 9/1995 |
| JP | 2000-6773 | * | 1/2000 |

* cited by examiner

PORTABLE FLUSHING APPARATUS FOR MOTOR VEHICLES

BACKGROUND OF THE INVENTION

1. Field of the Invention

The present invention relates generally to portable washing apparatus and, more specifically, to a portable spraying apparatus for motor vehicles whereby the exterior, especially the undercarriage is sprayed with a fluid for the removal of debris that may contain organic matter, such as noxious weeds.

While motor vehicles have revolutionized society by providing the means for traveling great distances in a short period of time, it has also introduced unforeseen hazards. One of these hazards is addressed by the present invention, the introduction of invasive plants that are harmful to a native ecosystem. These plants spread by seeds that are carried by water, animals and human transportation systems and once established are difficult, if not impossible to eradicate and if left unchecked damage an ecosystem, such as national forests.

The present invention provides means whereby vehicles, especially forestry service vehicles, can be subjected to a vigorous spray of water along the undercarriage and tires to remove mud and seeds. When these vehicles are used in infested areas, the present invention can be assembled to wash the vehicles and thereby severely reduce the potential of carrying noxious weeds to other area. In the preferred embodiment, the use is primarily targeted at the spread of noxious weed but is not limited to such, as it may be determined that flushing the undercarriages of vehicles produces other advantages. By adding detergent or insecticide to the water may reduce the spread of certain insects.

2. Description of the Prior Art

There is other spraying device designed for undercarriages. Typical of these is U.S. Pat. No. 2,749,180 issued to Andrews on Jun. 5, 1956.

Another patent was issued to Braunger on May 30, 1967 as U.S. Pat. No. 3,321,793. Yet another U.S. Pat. No. 3,795,254 was issued to Blosser on Mar. 5, 1974 and still yet another was issued on Dec. 2, 1975 to Lancaster as U.S. Pat. No. 3,923,658.

Another patent was issued to Allen, et al. on Sep. 18, 1979 as U.S. Pat. No. 4,168,231. Yet another U.S. Pat. No. 4,889,147 was issued to Chandler on Dec. 26, 1989. Another was issued to Chayer on Jul. 9, 1991 as U.S. Pat. No. 5,029,758 and still yet another was issued on Sep. 17, 1996 to Van Der Est as U.S. Pat. No. 5,556,535.

Another patent was issued to Kaipainen on Jun. 1, 1999 as U.S. Pat. No. 5,908,550 and still yet another was issued on Jan. 29, 2003 to Payne as U.K. Patent No. GB 2 377 879.

U.S. Pat. No. 2,749,180

Inventor: Alvadore M. Andrews

Issued: Jun. 5, 1956

In the manufacture of a sprinkling hose of the class described, the steps comprising perforating a flat, elongate strip of thin flexible plastic along two narrow longitudinally extending areas of the strip, one spaced on each of the opposite sides of the longitudinal center line of said strip, and thereafter cementing each of the longitudinal marginal edge portions of the strip to longitudinally extending portions of the strip closely adjacent said longitudinal center line and between said areas to form a pair of parallel fluid conduits each having apertures in the wall thereof for the escape of fluid.

U.S. Pat. No. 3,321,793

Inventor: Anthony J. Braunger

Issued: May 30, 1967

A device for steam cleaning and de-icing the lower portions of automobiles comprising a horizontally positioned grille structure adapted to receive an automobile thereon, a plurality of steam jets positioned beneath said grille structure for ejecting steam onto the lower portions of said automobile, steam pipes communicating to said jets, a valve member for releasing steam to said jets, a plate positioned above said grille structure and attached to said valve member for releasing said steam to said jets when the weight of a portion of an automobile rests upon said plate, certain of said jets being positioned outwardly, and being adapted to provide steam jets passing angularly upwardly and inwardly, a further plurality of jets being positioned inwardly and being further adapted to impinge upon certain lower portions of said automobile.

U.S. Pat. No. 3,795,254

Inventor: Nelson K. Blosser

Issued: Mar. 5, 1974

A device for spraying water against a vehicle to remove harmful salt and chemicals deposited on the vehicle during use. A plurality of parallel spaced conduits rest on a surface beneath the vehicle and extend longitudinally therewith. The conduits are connected to a water header which in turn is connected to a supply of water. A pair of these conduits are located along the outer sides of the vehicle and a plurality of these conduits are located underneath the vehicle between the front and rear wheels. A plurality of spray holes are formed in the upper portions of the outer conduits at various angles for spraying water against the sides of the vehicle at various heights. A plurality of spray holes are formed in the upper portions of the inner conduits at various angles for spraying water in various directions against the underside portions of the vehicle.

U.S. Pat. No. 3,923,658

Inventor: Peter John Lancaster

Issued: Dec. 2, 1975

A vehicle washing plant fitted with a water recycling circuit providing water for a washing cycle and a rinsing cycle and including a main filter containing a granulated filter medium, preferably activated carbon, and a back-wash filter, the circuit being connected to supply water for the rinsing cycle firstly through the backwash filter and subsequently through the main filter with preferably water for the washing cycle passing through the back-wash filter only; two preferred types of main filter are described which comprise a plurality of filter receptacles connected in series within a common casing at least one of the receptacles being easily replaceable.

U.S. Pat. No. 4,168,231

Inventor: Mark K. Allen

Issued: Sep. 18, 1979

A pump supplies water from a clarifier tank to a centrifugal separator, where solid particles are removed, and then to wash spray heads. A return or bypass conduit with a pressure-operated, modulating one-way valve permits water to pass from the outlet of the separator to the inlet of the pump in sufficient volume to ensure that the separator will operate at high velocity even when there is little or no demand for processed water at the spray heads as well as to recycle centrifuged water to further clean it. A float tank is coupled to and extends from the return conduit for enabling any trapped air to be expelled from the system. In addition, an air-bleeding conduit with a one-way check valve therein is placed in parallel with the return conduit to permit air flow in the direction opposite to that allowed by the valve therein to enable air to be removed from the system, especially when the pump is primed by supply of additional water thereto.

U.S. Pat. No. 4,889,147

Inventor: David A. Chandler

Issued: Dec. 26, 1989

A portable car wash apparatus that includes an upright U-shaped piping system partially circumscribing a car travel space. Water spray jets are located at various points along the piping system, such that when a car is driven through the circumscribed space jets of water are sprayed onto the car surface. The apparatus will clean the roof and side areas of the vehicle, as well as the underbody areas that are relatively inaccessible.

U.S. Pat. No. 5,029,758

Inventor: Steven A. Chayer

Issued: Jul. 9, 1991

A portable car wash system that uses water efficiently to wash cars in a parking lot is provided. A push cart is mounted on wheels and contains a water supply tank, an engine, and low- and high-pressure pumps. The engine drives the pumps. The low-pressure pump pumps water out of the tank and the high-pressure pump boosts the pressure of the water. The high-pressure water is delivered to a wand via a hose attached to a hose reel. The wand includes a positionable head that can be aimed to direct a high-pressure spray from a nozzle to the car being washed. A spray shield reduces overspray from the nozzle. A locking member holds the head in a desired position. A washing tool having a sponge and cover is used by an operator to hand wash the car. A soap injection system injects soap into the water by conventional venturi action when selected by the operator. The system is small enough to not disrupt traffic in the parking lot, can be used to wash a parked car without spraying adjacent cars, and uses only four to six gallons of water to wash a car.

U.S. Pat. No. 5,556,535

Inventor: N. Ver Der Est

Issued: Sep. 17, 1996

The invention relates to a method for the purification of a polluted liquid, especially a washing liquid used at a washing installation, by sucking the polluted liquid and leading it through at least one filter and next leading back the liquid purified thus to a take-off point, whereby the liquid flow carried through the filter is maintained at a substantially constant level. The invention further relates to an apparatus for carrying out the method comprising a suction line connected to a source of polluted liquid, a discharge line for the purified liquid debouching at a take-off point, at least one filter unit positioned between the suction line and the discharge line, a pump connected therewith in series and a device for limiting the amount of liquid flowing across the filter unit positioned in series with the filter unit. The described method and apparatus allow large savings on the amount of washing liquid required for operating a washing installation and lead to considerably decreased environmental damage.

U.S. Pat. No. 5,908,550

Inventor: Pasi Kaipainen

Issued: Jun. 1, 1999

A water reclamation system for a vehicle wash system that provides water that is purified to enable reclaimed water to be used in a positive displacement pump. The reclamation system provides for continuous flow of water through the vehicle wash settling pit with an aerator to oxygenate the water and prevent odors typically produced by stagnant water from wash system settling pits. The water reclamation system is operable to clean the carwash system settling pit except for the primary pit in which the debris accumulated from the secondary settling pit is deposited.

U.K. Patent Number GB 2 377 879

Inventor: Francis Dicker Payne et al.

Issued: Jan. 29, 2003

An apparatus for facilitating the cleaning and disinfecting of the underside and/or suspension of a vehicle comprises an array of upwardly directed nozzles, positioned transversely of a carriageway, means for supplying a disinfectant fluid to the nozzles and means for sensing the completion of the passage of the vehicle over the nozzles thereby terminating the supply of disinfectant solution. The sensing means may either be in the form of light sensors or pressure transducers. There is preferably a means for reducing the speed of the vehicle as it passes over the nozzles, this may be in the form of a double ramp. The apparatus maybe independent of electricity and/or water or it maybe connected to the mains supply.

While these spraying apparatus may be suitable for the purposes for which they were designed, they would not be as suitable for the purposes of the present invention, as hereinafter described.

SUMMARY OF THE PRESENT INVENTION

The present invention discloses a portable spraying apparatus for motor vehicles comprised of a source of water, e.g., a water tank, a pump for pressurizing the water, and conduit having a plurality of outlet apertures therein positioned substantially horizontal to said undercarriage. The conduit is positioned parallel to the vehicle having elements positioned adjacent the vehicle for cleaning the exterior sides and wheel wells while spaced apart conduit is positioned under the vehicle to produce a vigorous spray at the undercarriage. Also disclosed are a high pressure hose, high pressure water supply coupling, a pair of outside tube sections, a pair of risers, multiple unions, a pair of ramps, an arrow showing vehicle direction, a manifold and storage rack. The portable spraying apparatus for motor vehicles has spaced apart conduit positioned under the vehicle to produce a vigorous spray at the undercarriage. The conduit is positioned parallel to the vehicle having conduit positioned adjacent the vehicle with risers for cleaning the exterior sides and wheel wells and under the vehicle with multiple apertures positioned to deliver a spray from 90 to 30 degrees relative to the horizontal. Positioned within the conduit and forming an integral part therewith is at least one connective member having threaded distal ends whereby rotation of one member relative to another can occur to compensate for uneven ground.

A primary object of the present invention is to provide a portable system for the flushing of motor vehicle undercarriages and wheel wells.

Another object of the present invention is to provide means for removing debris from the tires, wheel wells and undercarriage of a motor vehicle such as mud, seeds and pollen.

Yet another object of the present invention is to provide a portable flushing system for motor vehicles that is easily assembled.

Still yet another object of the present invention is to provide a portable flushing system for motor vehicles having a source of fluid for flushing said vehicles.

A further object of the present invention is to provide a portable flushing system for motor vehicles having means for pressurizing said fluid prior to flushing said vehicles.

A yet further object of the present invention is to provide a portable flushing system for motor vehicles having conduit for delivering said pressurized fluid to the wheel wells and undercarriage of said vehicles.

A still yet further object of the present invention is to provide a portable flushing system for motor vehicles wherein said conduit has a plurality of apertures for directing the pressurized fluid against the undercarriage of said motor vehicles.

Another object of the present invention is to provide a portable flushing system for motor vehicles wherein said apertures are slotted to fan the spray.

Yet another object of the present invention is to provide a portable flushing system for motor vehicles wherein said apertures are deployed to provide a spray between 90 and 30 degrees relative to the horizontal.

Still yet another object of the present invention is to provide a portable flushing system for motor vehicles wherein the vehicles can drive over the conduits as the spraying occurs.

A further object of the present invention is to provide a portable flushing system for motor vehicles wherein said conduits are spaced apart and positioned parallel with said vehicle undercarriage.

A yet further object of the present invention is to provide a portable flushing system for motor vehicles wherein said spaced apart conduits reside under said vehicle and adjacent said vehicle whereby the vehicle undercarriage and wheel wells are sprayed simultaneously.

A still yet further object of the present invention is to provide a portable flushing system for motor vehicles wherein said undercarriage conduit is comprised of spaced apart parallel conduits.

Another object of the present invention is to provide a portable flushing system for motor vehicles wherein said conduit remain substantially parallel to said undercarriage during the spraying.

Yet another object of the present invention is to provide an articulated connection member whereby the flushing system compensates for uneven ground.

Still yet another object of the present invention is to provide a portable flushing system for motor vehicles wherein said conduit can incorporate somewhat vertical elements for delivering a spray for high body vehicles.

An additional object of the present invention is to provide a portable flushing system for motor vehicles wherein said fluid is water.

Another object of the present invention is to provide a portable flushing system wherein said water can contain detergent, pesticides, herbicides or other additives.

Yet another object of the present invention is to provide a portable flushing system wherein said system provides means for applying a liquefied substance to a motor vehicle.

Still yet another object of the present invention is to provide a portable flushing system wherein said fluid is contained within a portable tank.

A further object of the present invention is to provide a portable flushing system for motor vehicles wherein said fluid is contained within a truck.

A yet further object of the present invention is to provide a portable flushing system for motor vehicles wherein said system provides means for collecting the spent spray.

A still yet further object of the present invention is to provide a portable flushing system for motor vehicles wherein said spent spray is recycled for reuse.

Another object of the present invention is to provide a portable flushing system for motor vehicles wherein said recycled spray is filtered prior to reuse.

Yet another object of the present invention is to provide a portable flushing system for motor vehicles wherein said recycling system constitutes a closed system.

Still yet another object of the present invention is to provide a portable flushing system for motor vehicles wherein said closed system removes the potential of introducing unwanted elements into the environment by containing said elements within the filtering elements.

A further object of the present invention is to provide a portable flushing system for motor vehicles wherein said filtering is comprised of three separate filters.

A yet further object of the present invention is to provide a portable flushing system for motor vehicles wherein said filtering is comprised of a centrifugal filter, strainer, and wound cartridge.

Additional objects of the present invention will appear as the description proceeds.

The present invention overcomes the shortcomings of the prior art by providing a portable spraying apparatus for a motor vehicle's wheels and undercarriage comprised of a source of water, a pump for pressurizing said water, and conduit having a plurality of apertures positioned substantially horizontal to said undercarriage. The conduit is positioned parallel to said vehicle having elements positioned adjacent the vehicle for cleaning the exterior sides and wheel wells while spaced apart conduit is positioned under the vehicle to produce a vigorous spray at the undercarriage. Additionally, the conduit has at least one centrally positioned member having threaded distal ends forming an articulated element whereby the device will lay flat on uneven ground.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
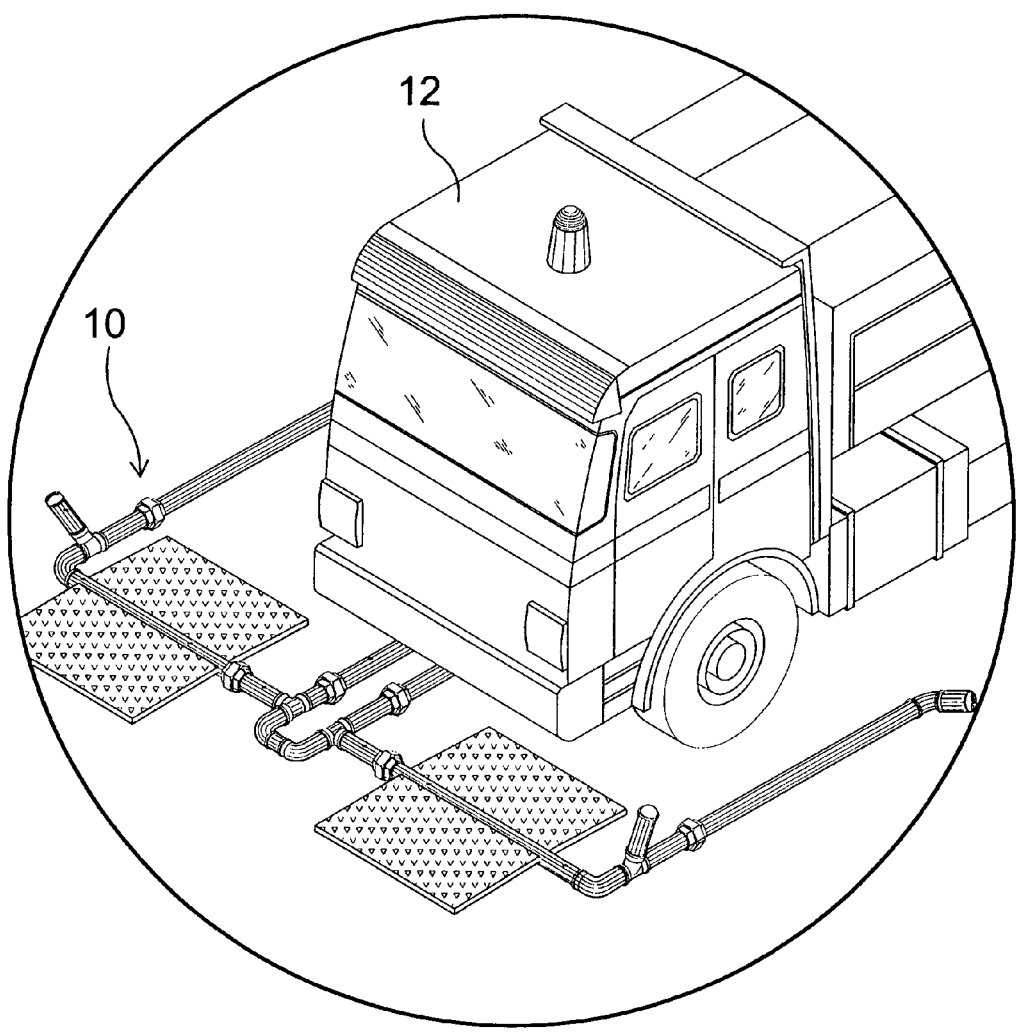
FIG. 1 is an illustrative view of the present invention.

With regard to reference numerals used, the following numbering is used throughout the drawings.

10 present invention
12 vehicle
14 hose
16 water tank
18 pump
20 conduit
22 high pressure hose
24 high pressure coupling
26 outside tube sections
28 center tube sections
29 cross connector
30 risers
32 union
33 rotatable joint
34 ramps
36 direction arrow
38 manifold
40 storage rack
42 spray
44 undercarriage
46 exterior side
48 wheel well
50 apertures
52 supply tank
54 holding tank
56 containment vessel
58 supply tank pump
60 holding tank pump
62 filter system
64 stage 1 filter
66 stage 2 filter
68 stage 3 filter
70 sump pump

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to appended claims.

Turning to FIG. 1, shown therein is an illustrative view of the present invention 10. The present invention 10 provides a system for flushing the undercarriage of a vehicle 12. More importantly the present invention 10 prevents the transportation of noxious weed seeds to residential, agricultural and areas with natural vegetation such as forests and grassland. Lodged in the crevices of tire treads, stuck on spring coils or chassis frame noxious weed seeds can spread and germinate in as little time as a week. The spread of noxious weeds causes soil erosion, degenerates water sheds, displaces valuable riparian vegetation and negatively affects fisheries by changing the nature and composition of stream banks.

Figure 2:
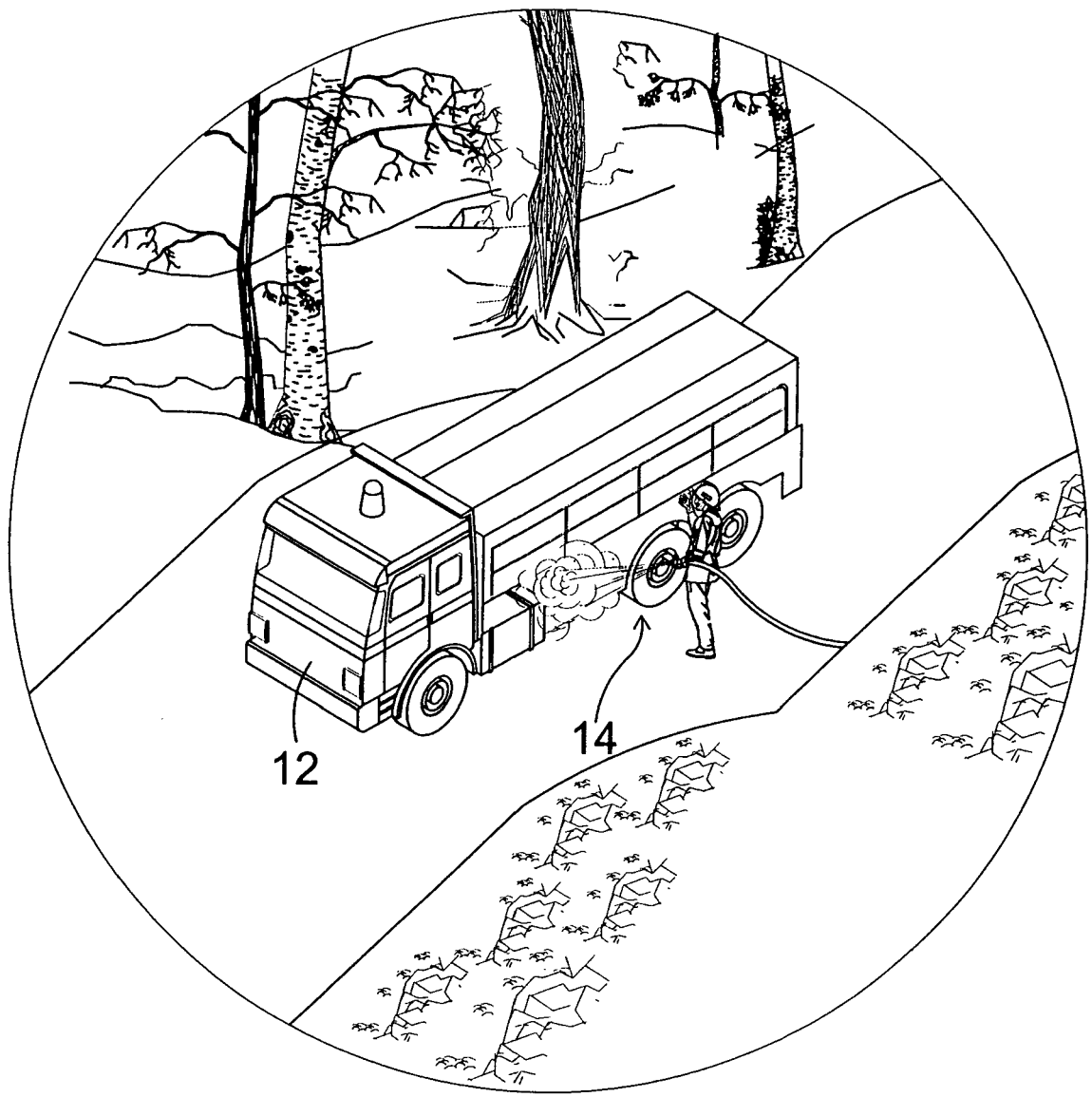
FIG. 2 is an illustrative view of prior art.

Turning to FIG. 2, shown therein is an illustrative view of the prior art. The only way presently to remove noxious weeds and other debris from vehicles is to spray them with a handheld hose 14. This method clearly lacks the thoroughness that can be provided by an apparatus such as the present invention wherein the vehicle 12 can pass over as the undercarriage is vigorously sprayed.

Figure 3:
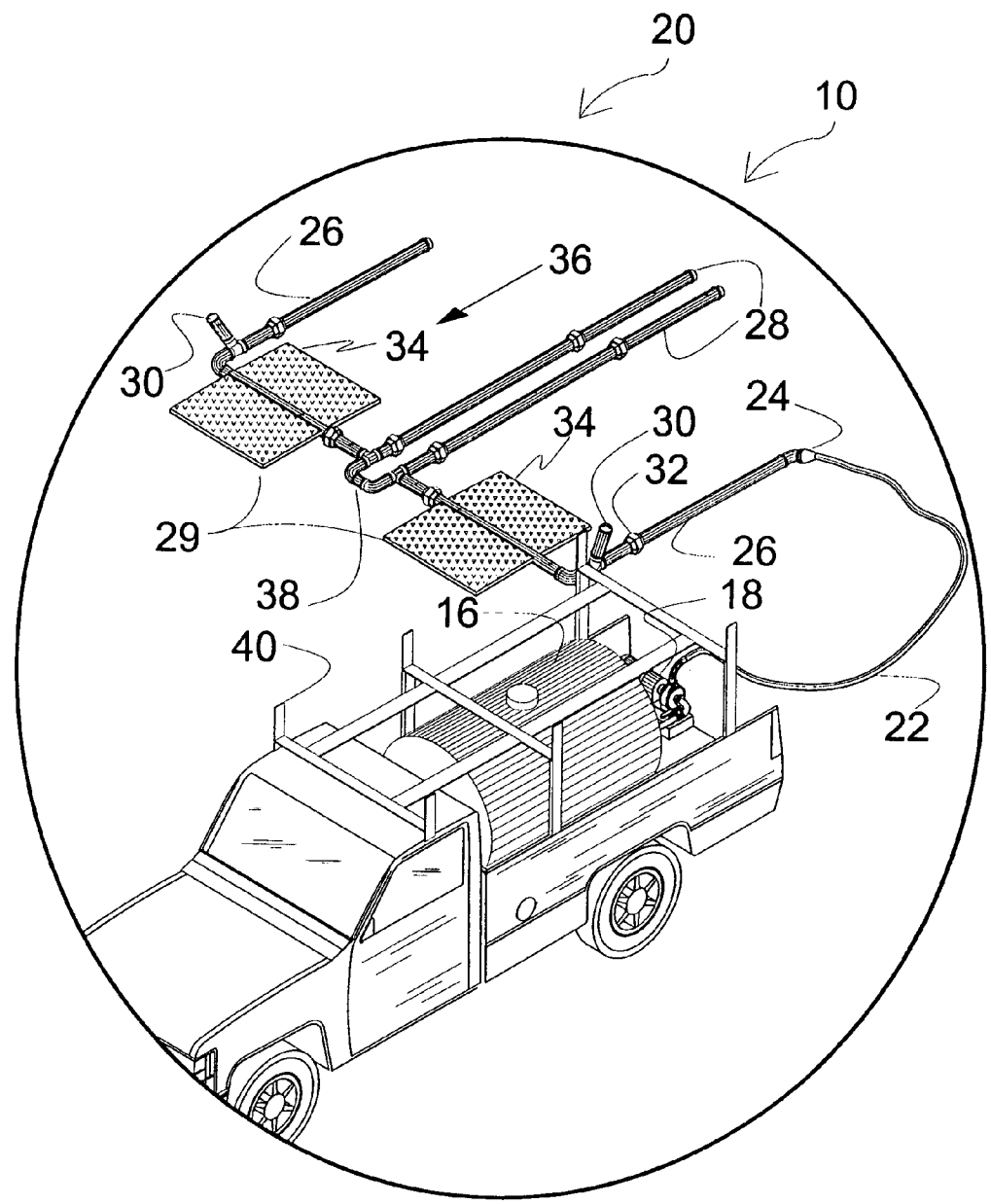
FIG. 3 is an illustrative view of the present invention.

Turning to FIG. 3, shown therein is an illustrative view of the present invention 10. The present invention 10 provides a portable spraying apparatus for motor vehicles comprised of a source of water, e.g., a water tank 16, a pump 18 for pressurizing the water, and conduit 20 having a plurality of outlet apertures therein positioned substantially horizontal to the undercarriage. The conduit 20 is positioned parallel to the vehicle having riser elements 30 positioned adjacent the vehicle for cleaning the exterior sides and wheel wells while spaced apart conduit is positioned under the vehicle to produce a vigorous spray at the undercarriage. The spraying apparatus has a left and a right side that are substantially similar with a perpendicular threaded cross connective member 29 having a manifold 38 disposed in its middle with multiple threaded connecting members which can be independently manipulated whereby the device will lay flat on uneven ground. Shown are a high pressure hose 22, high pressure water supply coupling 24, a pair of outside tube sections 26, a pair of center tube sections 28, a pair of risers 30, multiple unions 32, a pair of ramps 34, an arrow 36 showing vehicle direction, a manifold 38 and storage rack 40.

Figure 4:
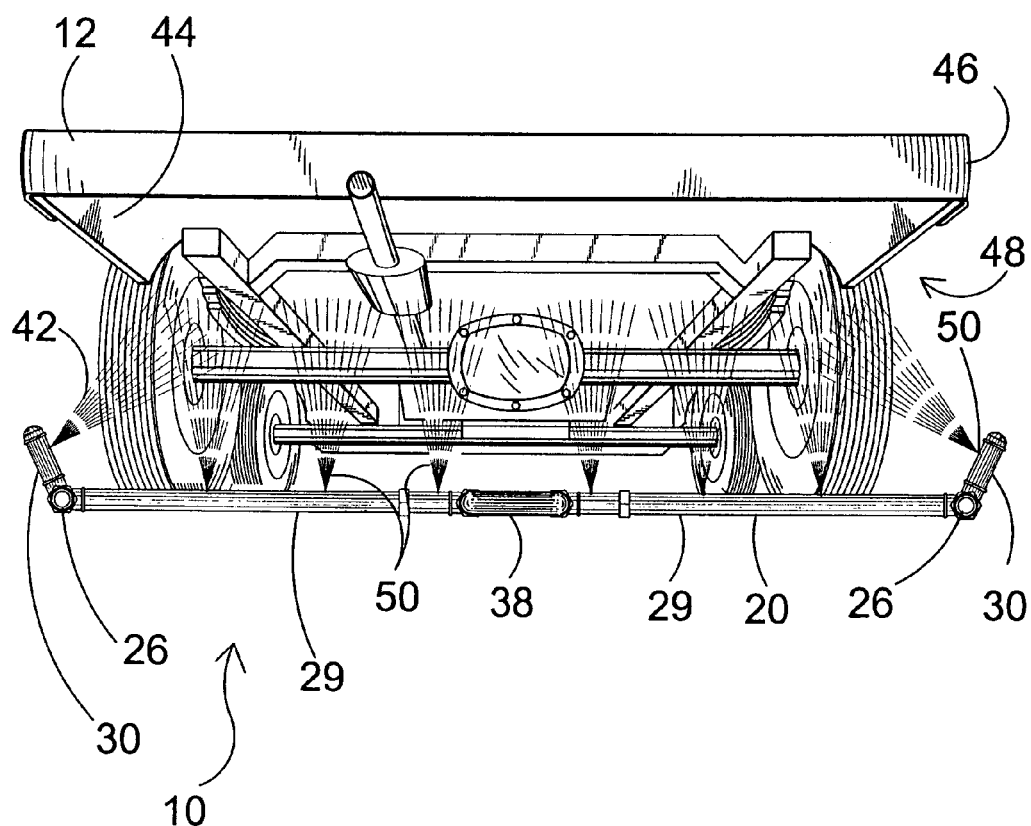
FIG. 4 is a perspective view of the present invention in use.

Turning to FIG. 4, shown therein is a perspective view of the present invention 10 in use. Shown is the portable spraying apparatus for motor vehicles 12 having spaced apart conduit 20 positioned under the vehicle to produce a vigorous spray 42 at the undercarriage 44. The conduit 20 is positioned parallel to the vehicle 12 having outside sections 26 of conduit connected by cross connectors 29 positioned adjacent the vehicle with risers 30 for cleaning the exterior sides 46 and wheel wells 48 and under the vehicle with multiple apertures 50 positioned to deliver a spray 42 from 90 to 30 degrees relative to the horizontal. Positioned within the conduit 20 and forming an integral part therewith is at least one connective manifold member 38 having threaded members whereby rotation of one member relative to another can occur to compensate for uneven ground.

Figure 5:
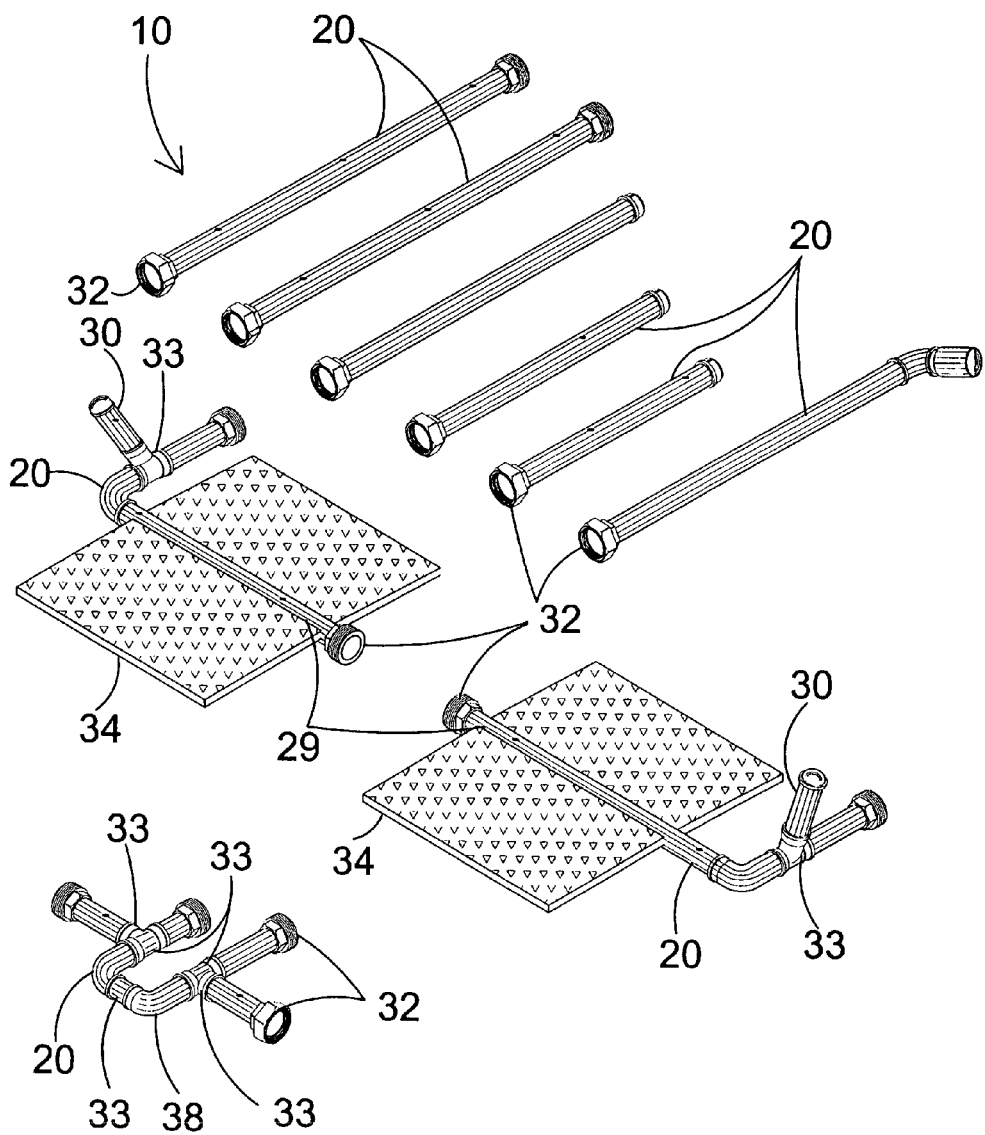
FIG. 5 is an exploded view of the present invention.

Turning to FIG. 5, shown therein is an exploded view of the present invention 10. Shown is an exploded view of the multiple pieces of conduit 20 of the portable spraying apparatus for motor vehicles. The conduit 20 is assembled with unions 32 whereby the vehicle travels over the ramps 34 traveling parallel to the conduit which has element positioned adjacent the exterior side and spaced apart conduit on the underside. Risers 30 with rotatable joints 33 on the exterior side provide means for washing the exterior and wheel wells of the vehicle. Also shown are manifold 38 with multiple threaded unions 32 and rotatable unions or joints 33 which can be turned in all directions along with cross connections 29.

Figure 6:
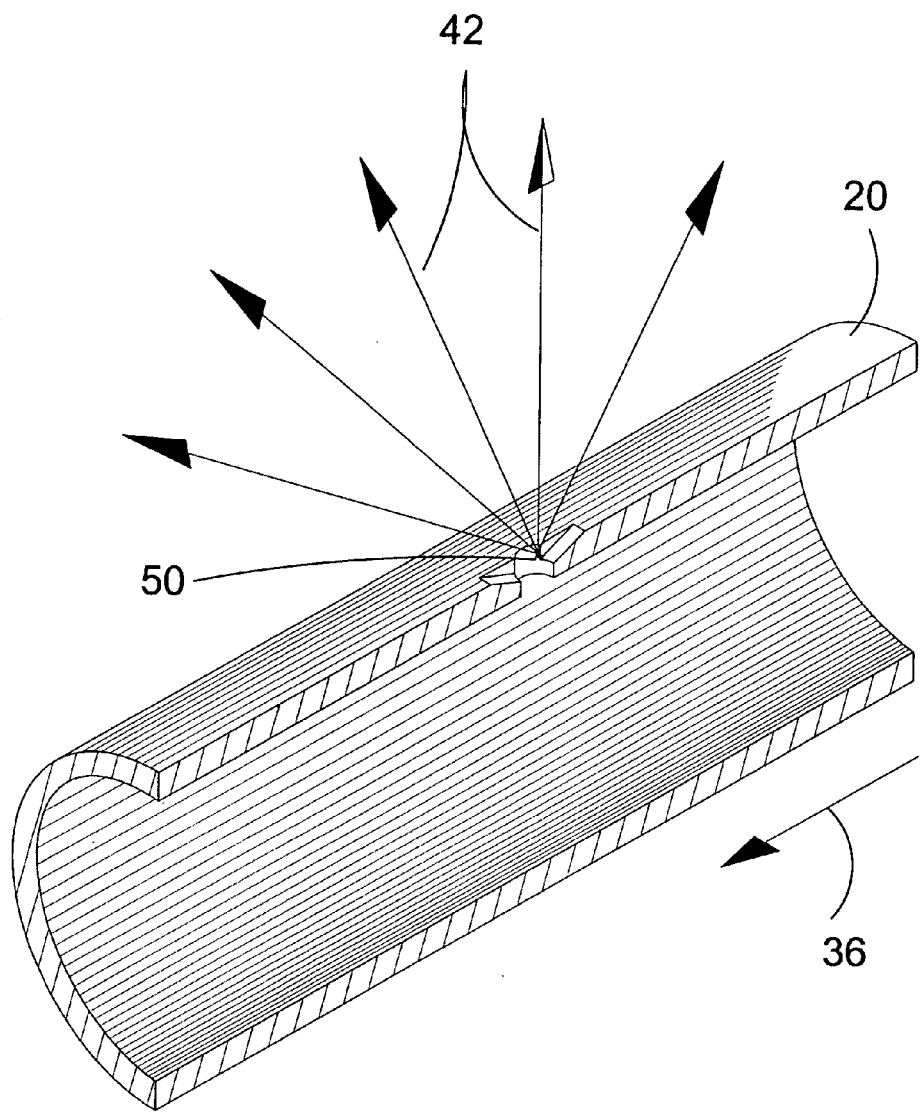
FIG. 6 is a cross sectional view of the spray orifice.

Turning to FIG. 6, shown therein is a cross sectional view of the spray orifice 50. Shown is a sectional view of one of the apertures or orifices 50 within the conduit 20 piece having a slot-like configuration which will cause the fluid spray 42 to fan thereby covering the complete undercarriage. Arrow 36 shows the water supply flow.

Figure 7:
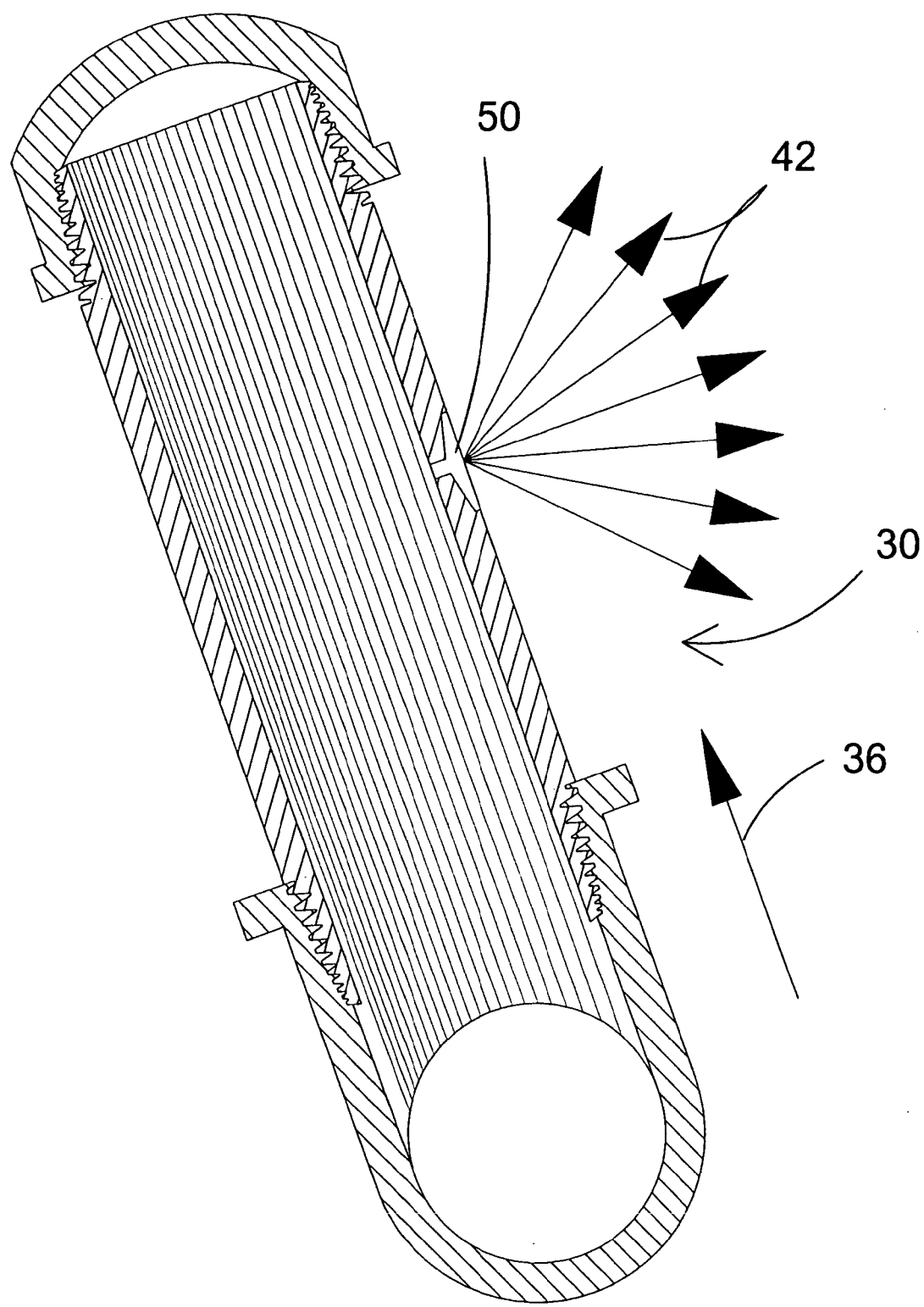
FIG. 7 is a cross sectional view of the riser.

Turning to FIG. 7, shown therein is a cross sectional view of the riser 30. Shown is a cross section view of the riser 30 having at least one aperture 50 providing a fan-like spray 42 for the sides and wheel wells of the vehicle. The riser 30 size can vary depending on the size of the vehicle being sprayed. Additionally, risers 30 can be placed on the interior conduits again depending on the type of vehicle being sprayed. Arrow 36 shows the water supply flow.

Figure 8:
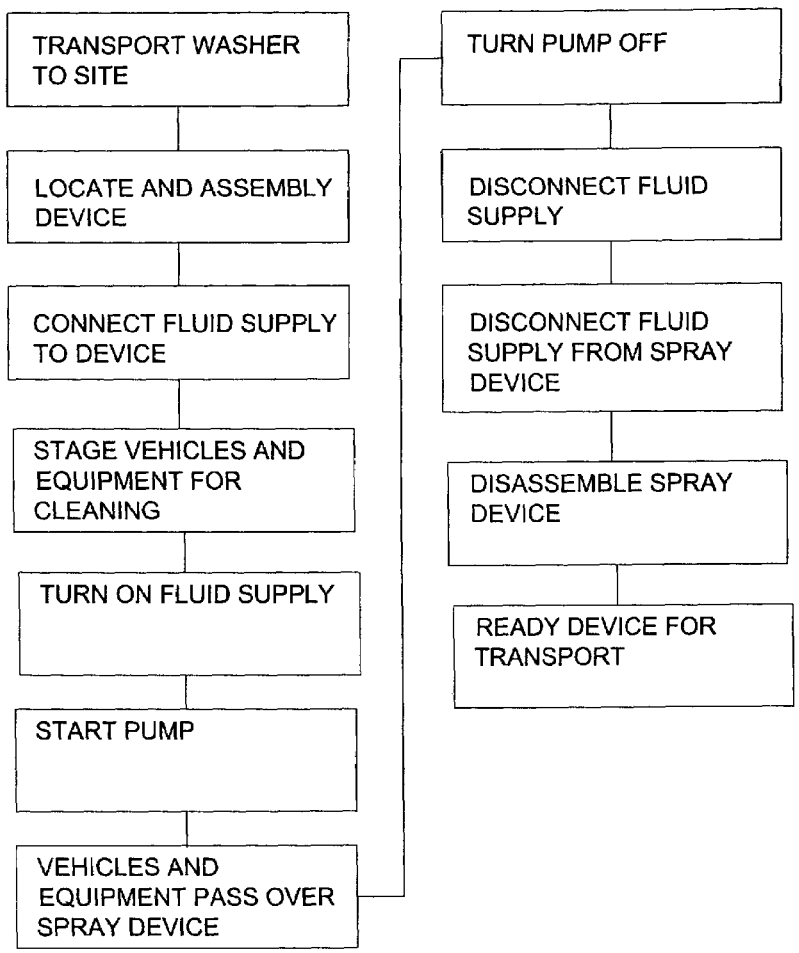
FIG. 8 is A block diagram of the method of the present invention.

Turning to FIG. 8, shown therein is a block diagram of the method of the present invention. The present invention provides means for quickly flushing the sides, tires and undercarriage of a vehicle having a pressurized fluid source and conduit for delivering the fluid to the vehicle. The method of the present invention includes the following steps: 1) transport washer to site; 2) locate and assemble device; 3) connect fluid supply to device; 4) stage vehicles and equipment for cleaning; 5) turn on fluid supply; 6) start pump; 7) vehicles and equipment pass over spray device; 8) turn pump off; 9) disconnect fluid supply; 10) disconnect fluid supply from spray device; 11) disassemble spray device; and 12) ready device for transport.

Figure 9:
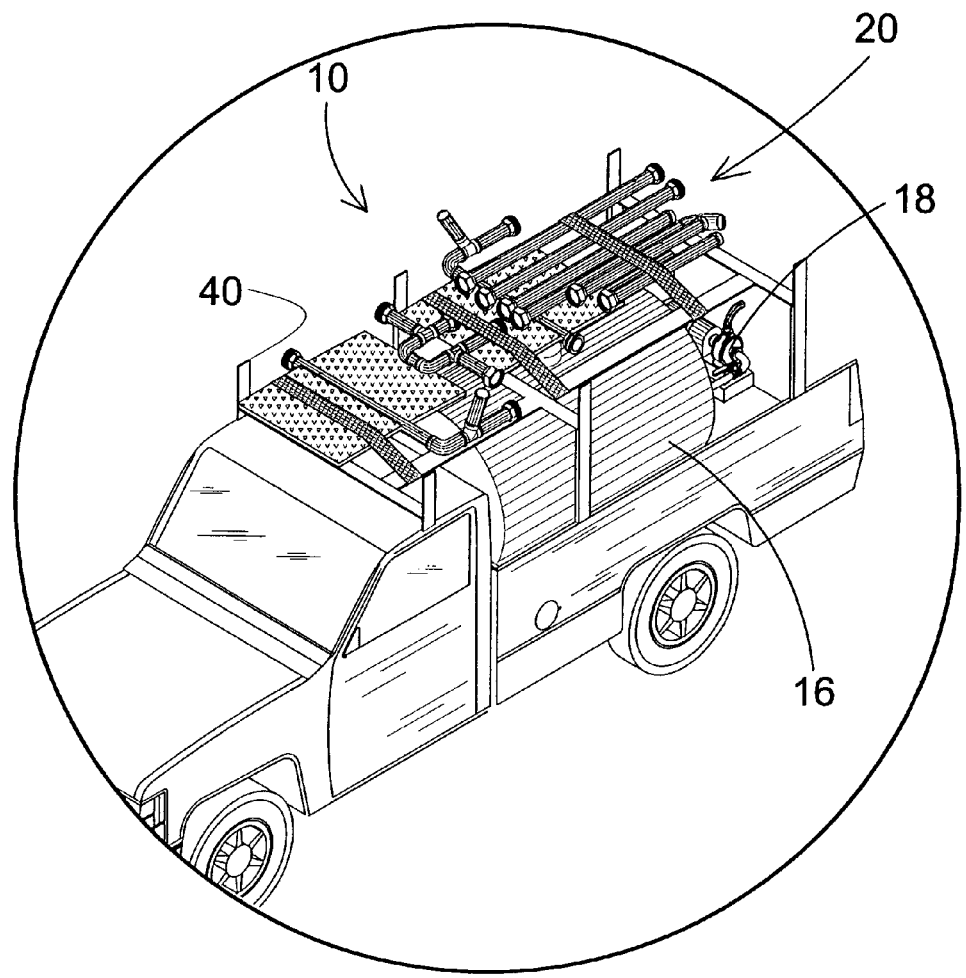
FIG. 9 is an illustrative view of the present invention.

Turning to FIG. 9, shown therein is an illustrative view of the present invention 10. As illustrated the present invention 10 is portable comprising a source of fluid 16, a pump 18 for pressurizing the fluid, and a modular assembly of conduit 20 placed on storage rack 40 having a plurality of apertures positioned substantially horizontal to the vehicle undercarriage. The conduit 20 is assembled and connected to the fluid source 16 where it will be parallel to the vehicle having elements positioned adjacent the vehicle for cleaning the exterior sides and wheel wells while spaced apart conduit is under the vehicle to produce a vigorous spray at the undercarriage.

Figure 10:
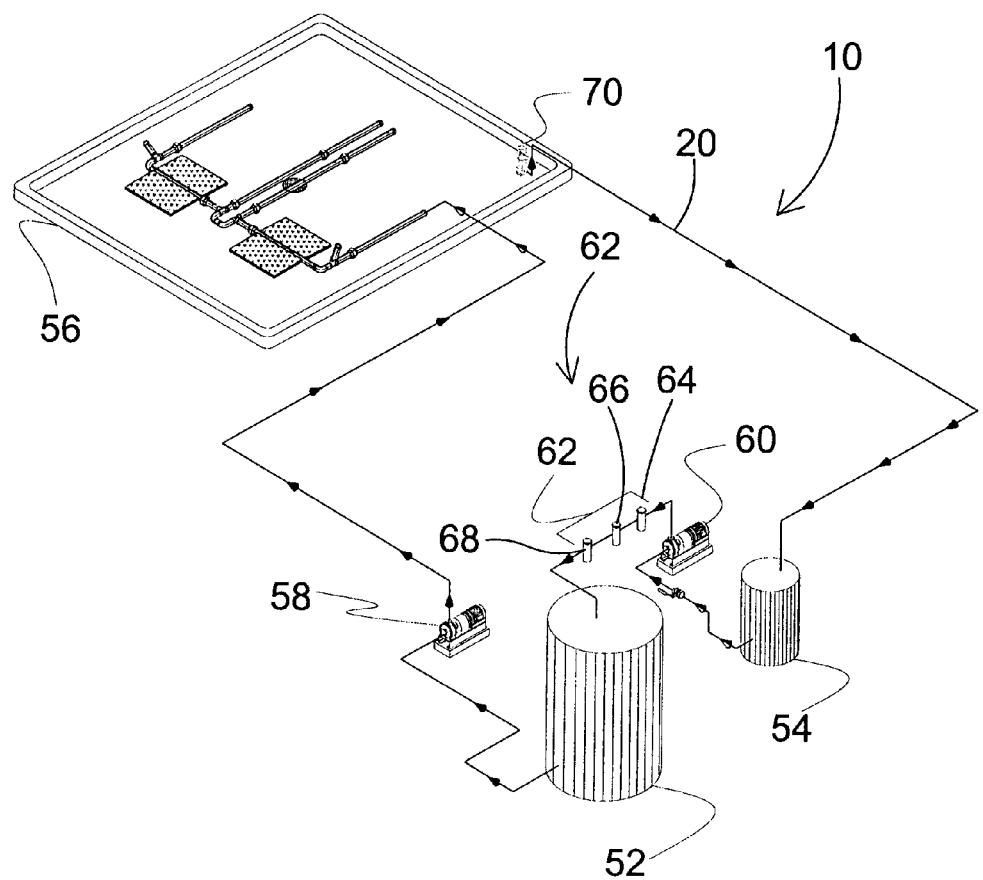
FIG. 10 is an illustrative view of an additional element of the present invention.

Turning to FIG. 10, shown therein is an illustrative view of an additional element of the present invention 10. Additional elements of the present invention 10 would provide a portable recirculating closed system connected by conduit 20 whereby vehicles could be washed at any location without leaving any of the seeds or debris behind. The portable supply tank 52, the holding tank 54 and portable containment vessel 56 would be fabricated from a polymeric material that could be folded and stowed for portability. As the fluid is dispensed against the vehicle it would be contained in vessel 56 and placed in a holding tank 54 to be pumped at 58, 60 through filter system 62 before being dispensed again. Pump 58 is for the supply tank and pump 60 is for the holding tank. The filter system 62 may have a stage 1 centrifugal filter 64, a stage 2 strainer 66, and a stage 3 wound cartridge filter 68. A sump pump 70 is also shown.

I claim:

1. A portable apparatus for flushing an undercarriage of a vehicle, comprising:
    a) a water source mounted on a truck for providing water to the apparatus, said apparatus being deployed on a ground surface for use;
    b) a pump for pumping water to the apparatus from said water source;
    c) a water supply hose for conveying water to the apparatus from said water source;
    d) a plurality of spaced and parallel elongated center conduits arranged on the ground in a direction of travel and along a central portion of said vehicle for conveying water, said conduits each having a plurality of orifices therein to permit water to be sprayed onto the undercarriage of said vehicle, said spaced and parallel elongated conduits being interconnected by a manifold at a forward end of said center conduits;
    e) a plurality of unions for joining said conduits together;
    f) a pair of outside conduit sections parallel to said center conduits being substantially horizontally disposed on each outer side of the vehicle, each of said outside conduit sections having first and second opposing ends, wherein each of said first ends is oriented toward a front of the vehicle, wherein each of said outside conduit sections is disposed parallel to the outer side of the vehicle to permit the outer side of the vehicle to be cleaned;
    g) a cross connector connecting the first end of each outside conduit section to one of said center conduits, said cross connector being substantially perpendicularly disposed to said outside conduit sections;
    h) said manifold being disposed between said cross connectors, the manifold having multiple rotatable threaded joints which are rotatable relative to each other to allow the apparatus to lay flat on an unlevel ground surface;
    i) said center conduits being substantially horizontally disposed between and parallel to said pair of outside conduit sections for washing a center part of the undercarriage of the vehicle, said center conduits having first and second opposing ends, wherein each said first end is oriented toward the front of the vehicle, wherein said first end is joined to said a manifold;
    j) a pair of ramps wherein one ramp is disposed under each cross connector between said outside conduit sections and said manifold to provide a ramp for the wheels of the vehicle to travel over as the vehicle is cleaned by the apparatus, said ramps being adjustable by said multiple rotatable threaded joints to lay said ramps flat on the unlevel ground surface; and k) said water supply hose being connected between said pump and a second end of one of said outside conduit sections for providing high pressure water to said apparatus.

2. The apparatus of claim 1, further comprising a riser being disposed on each of said first ends of said outside conduit sections for cleaning wheel wells and outside surfaces of the vehicle.

3. The apparatus of claim 2, wherein said risers are disposed angularly to a horizontal plane wherein water spray from said risers forms an angle ranging from 30 degrees to 90 degrees relative to the horizontal plane.

4. The apparatus of claim 3, wherein said risers have rotatable joints wherein said joints rotate from 30 degrees to 90 degrees relative to the horizontal plane.

5. The apparatus of claim 4, wherein said manifold comprises a plurality of conduits having rotatable joints, wherein said joints connect said conduits to form said manifold, wherein said manifold further comprises a plurality of unions for joining other conduits thereto.

6. The apparatus of claim 5, wherein each said ramp and an associated cross connector is manufactured as a single piece.

7. The apparatus of claim 6, wherein said orifices comprise a slot configuration for providing a fan spray of water.

8. The apparatus of claim 7, wherein said truck has racks to carry said apparatus after disassembly so that said portable apparatus can be moved to any desired location for use.

9. The apparatus of claim 8, wherein said water source comprises detergent for cleaning the undercarriage of the vehicle.

10. The apparatus of claim 9, wherein said water source comprises insecticide for removing insects from the undercarriage of the vehicle.

11. The apparatus of claim 10, further comprising a portable containment vessel being disposed around said pair of outside conduit sections, said cross connector, said manifold, said center conduits and said ramps to permit the water therefrom to be contained.

12. The apparatus of claim 11, further comprising a portable sump pump being disposed in said containment vessel, further comprising a portable holding tank to permit water to be pumped by the sump pump from the containment vessel to the holding tank.

13. The apparatus of claim 12, further comprising a portable pump and a portable filter system for pumping water from said holding tank, through said filter system and into said water source to provide a recirculating water system.

14. The apparatus of claim 13, wherein said filter system comprises a centrifugal filter.

15. The apparatus of claim 14, wherein said filter system comprises a strainer.

16. The apparatus of claim 14, wherein said filter system comprises a wound cartridge filter.

* * * * *